(12) United States Patent
Losey

(10) Patent No.: US 8,381,785 B2
(45) Date of Patent: Feb. 26, 2013

(54) SELF-INFLATING TIRE ASSEMBLY

(75) Inventor: Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 561 days.

(21) Appl. No.: 12/775,552

(22) Filed: May 7, 2010

(65) Prior Publication Data

US 2011/0272073 A1    Nov. 10, 2011

(51) Int. Cl.
  *B60C 23/00*    (2006.01)
  *B60C 23/12*    (2006.01)
  *B60C 19/00*    (2006.01)
(52) U.S. Cl. ............... 152/450; 152/415; 152/419
(58) Field of Classification Search ............ 152/415, 152/418, 419, 425, 426, 450
  See application file for complete search history.

(56) References Cited

U.S. PATENT DOCUMENTS

| 3,304,981 | A |  | 2/1967 | Sheppard | 152/426 |
| 3,867,973 | A |  | 2/1975 | Cozzolino et al. | 152/153 |
| 8,113,254 | B2 | * | 2/2012 | Benedict | 152/426 |
| 2009/0294006 | A1 |  | 12/2009 | Hrabal | 152/426 |

FOREIGN PATENT DOCUMENTS

| WO | 2005/012009 A1 | 2/2005 |
| WO | 2007/134556 A1 | 11/2007 |

OTHER PUBLICATIONS

European Search Report completed Aug. 16, 2011.

* cited by examiner

*Primary Examiner* — Justin Fischer
(74) *Attorney, Agent, or Firm* — Rocahrd B. O'Planick

(57) ABSTRACT

A self-inflating tire assembly includes a tire having a tire cavity between first and second sidewalls that extend respectively from first and second tire core beads to a tire tread region. At least one of the sidewalls is provided with an air tube peristaltic pump assembly. An air tube has an internal tube air passageway and is positioned within a sidewall groove in contacting engagement with opposite groove surfaces surrounding the air tube. The sidewall groove operatively bends within a rolling tire footprint to compress the air tube from an expanded diameter to a flat diameter adjacent the rolling tire footprint. A core bead passageway extends within a core bead adjacent the one tire sidewall for operatively storing air evacuated from the air tube passageway. Conduits are provided to route air from the air tube to the core bead passageway and valve mechanisms are positioned within the core bead passageway to control the flow of air from the core bead passageway into the tire cavity.

15 Claims, 12 Drawing Sheets

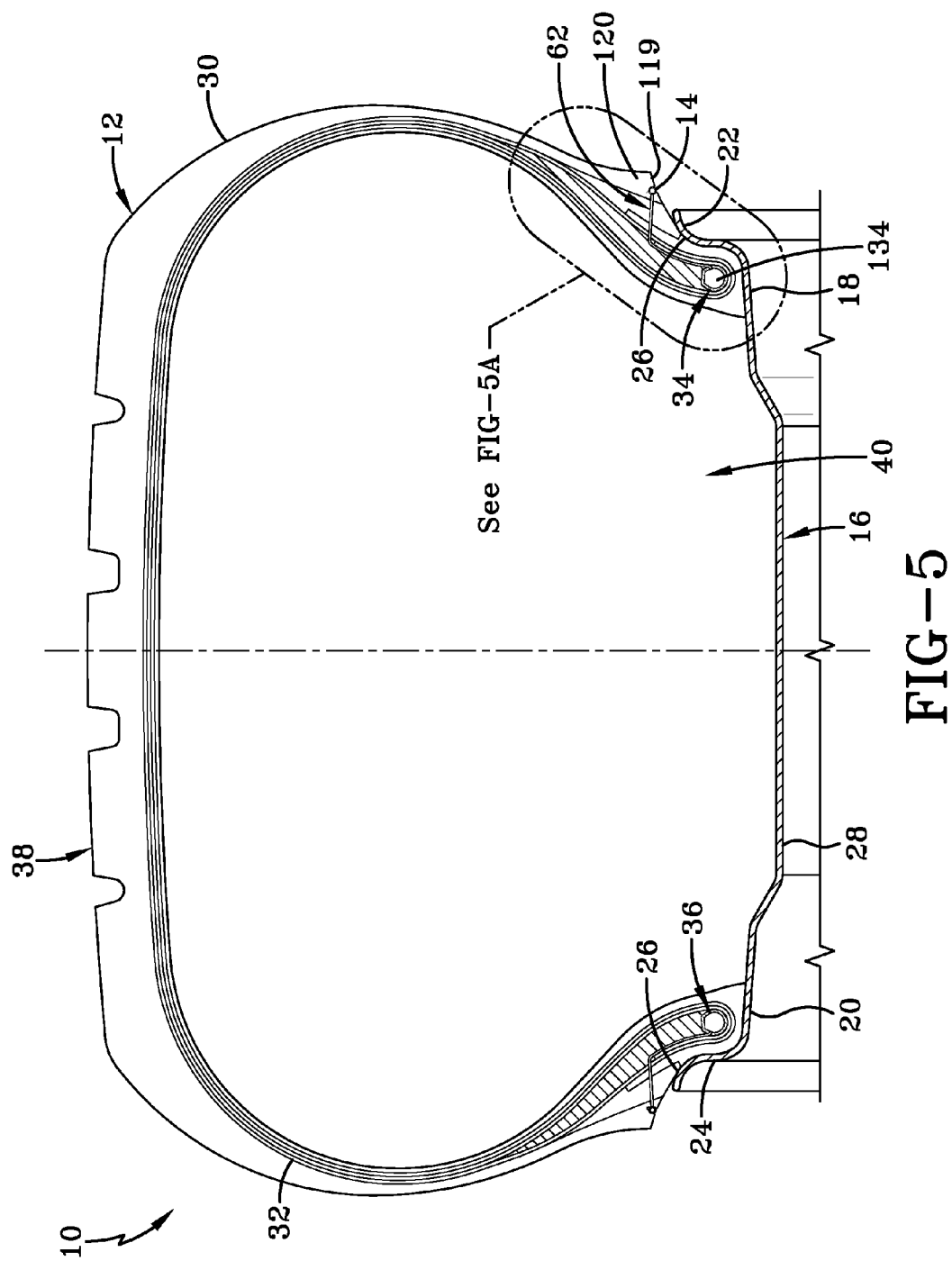

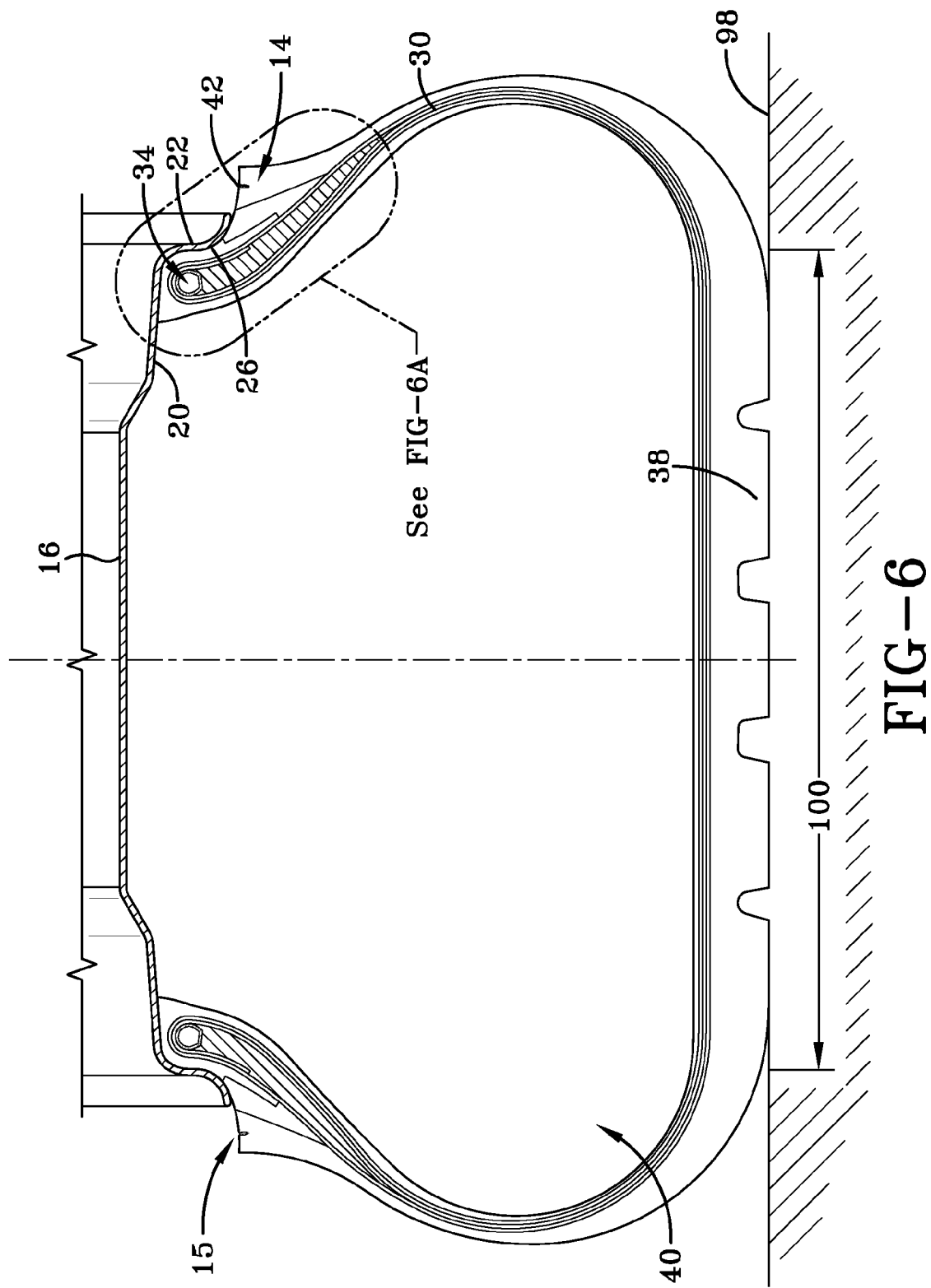

SELF-INFLATING TIRE ASSEMBLY

FIELD OF THE INVENTION

The invention relates generally to self-inflating tires and, more specifically, to a tire assembly incorporating a pump mechanism.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate a self-inflating feature within a tire that will self-inflate the tire in order to compensate for any reduction in tire pressure over time without a need for driver intervention.

SUMMARY OF THE INVENTION

According to an aspect of the invention, a self-inflating tire assembly includes a tire having a tire cavity between first and second sidewalls that extend respectively from first and second tire core beads to a tire tread region. At least one of the sidewalls is provided with an air tube peristaltic pump assembly. The one sidewall has a bending region operatively bending within a rolling tire footprint responsive to a bending strain and a sidewall groove positioned within the bending region. An air tube has an internal tube air passageway and is positioned within the sidewall groove in contacting engagement with opposite groove surfaces surrounding the air tube. The sidewall groove operatively bends within the bend region within a rolling tire footprint to compress the air tube from an expanded diameter to a flat diameter adjacent the rolling tire footprint to flatten the air tube segment along the tube air passageway. A core bead passageway extends within a core bead adjacent the one tire sidewall for operatively storing air evacuated from the air tube passageway. Conduits are provided to route air from the air tube to the core bead passageway and valve mechanisms are positioned within the core bead passageway to control the flow of air from the core bead passageway into the tire cavity.

In another aspect, wherein the tire includes a tire apex component adjacent the first tire core bead and a tire inner ply turnup portion extends around the first tire core bead and radially along the tire apex component to an inner ply turnup end. A core bead conduit extends from the air tube along a path extending between the inner ply turnup and the tire apex component to the first tire core bead.

In yet a further aspect, the core bead conduit includes a first core bead conduit segment extending substantially axially inward from the air tube through a tire chafer component, and a second core bead conduit segment extending substantially radially from the first core bead conduit segment along the path situated between the inner ply turnup and the tire apex component to the first tire core bead.

The air tube and the sidewall groove, in another aspect of the invention, are located within the tire chafer component at a radial position opposite the inner ply turnup end.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 5 is a transverse section view through a tire having an air tube assembly mounted within opposite respective sidewalls.

FIG. 6 is a section view of the air tube, tire, and rim assembly with the air tube located within a configured sidewall groove pursuant to the invention.

DETAILED DESCRIPTION OF THE INVENTION

Figure 1:
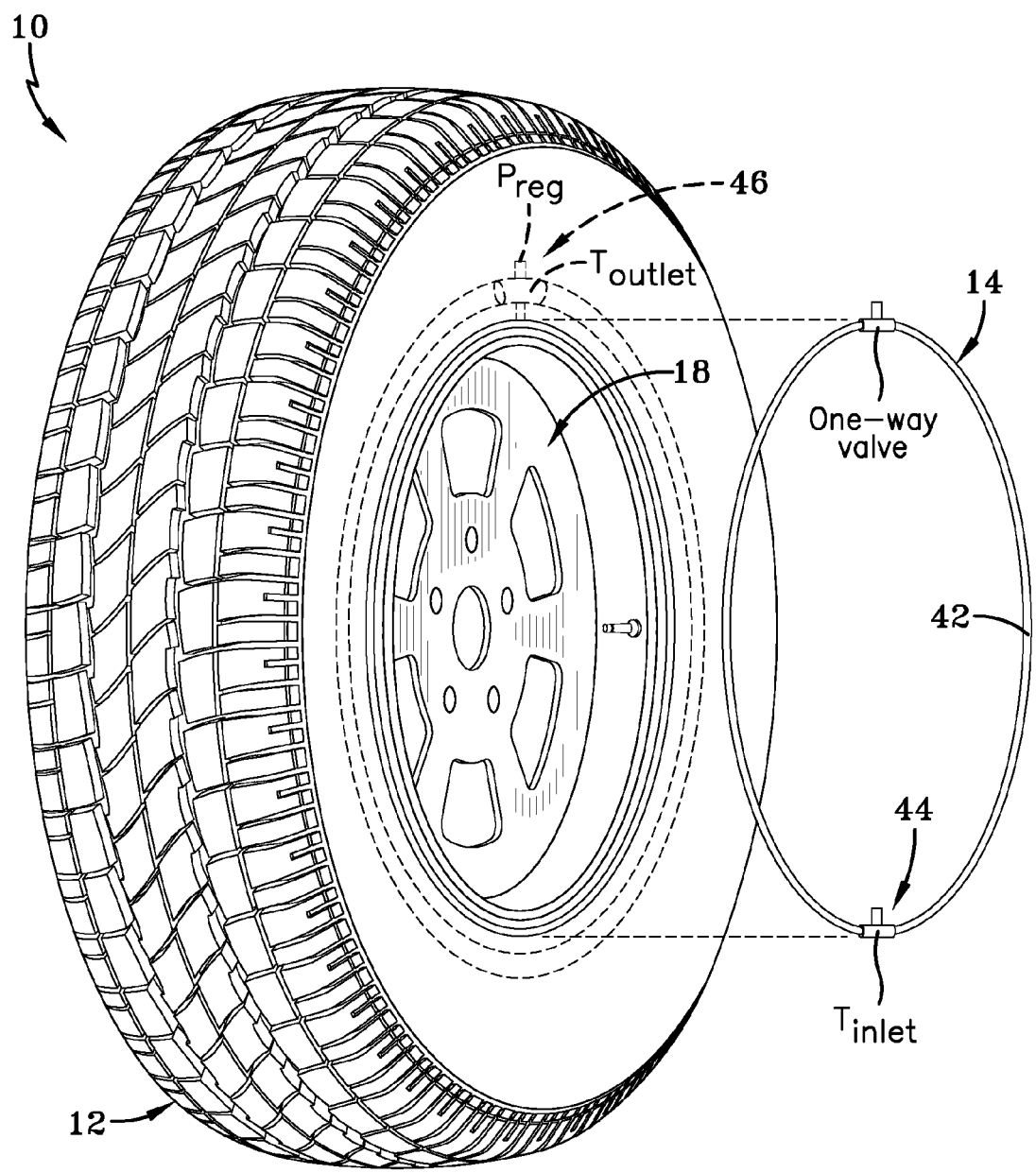
FIG. 1 is an isometric view of a tire, rim and tubing with peristaltic pump and inlet valve.
Figure 1A:
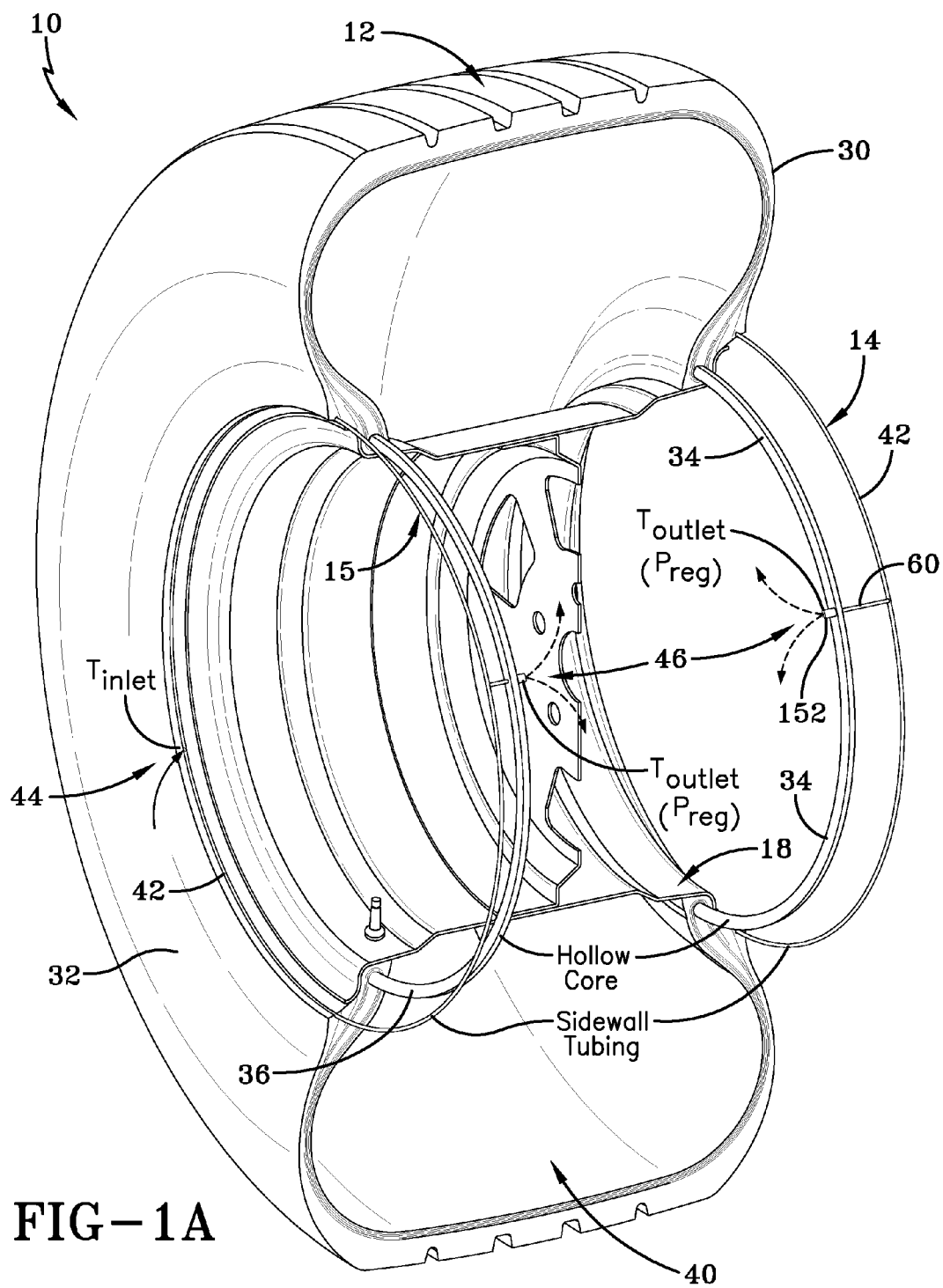
FIG. 1A is an isometric view partially in section of a tire, rim, with dual sidewall and bead core pump assemblies.
Figure 2:
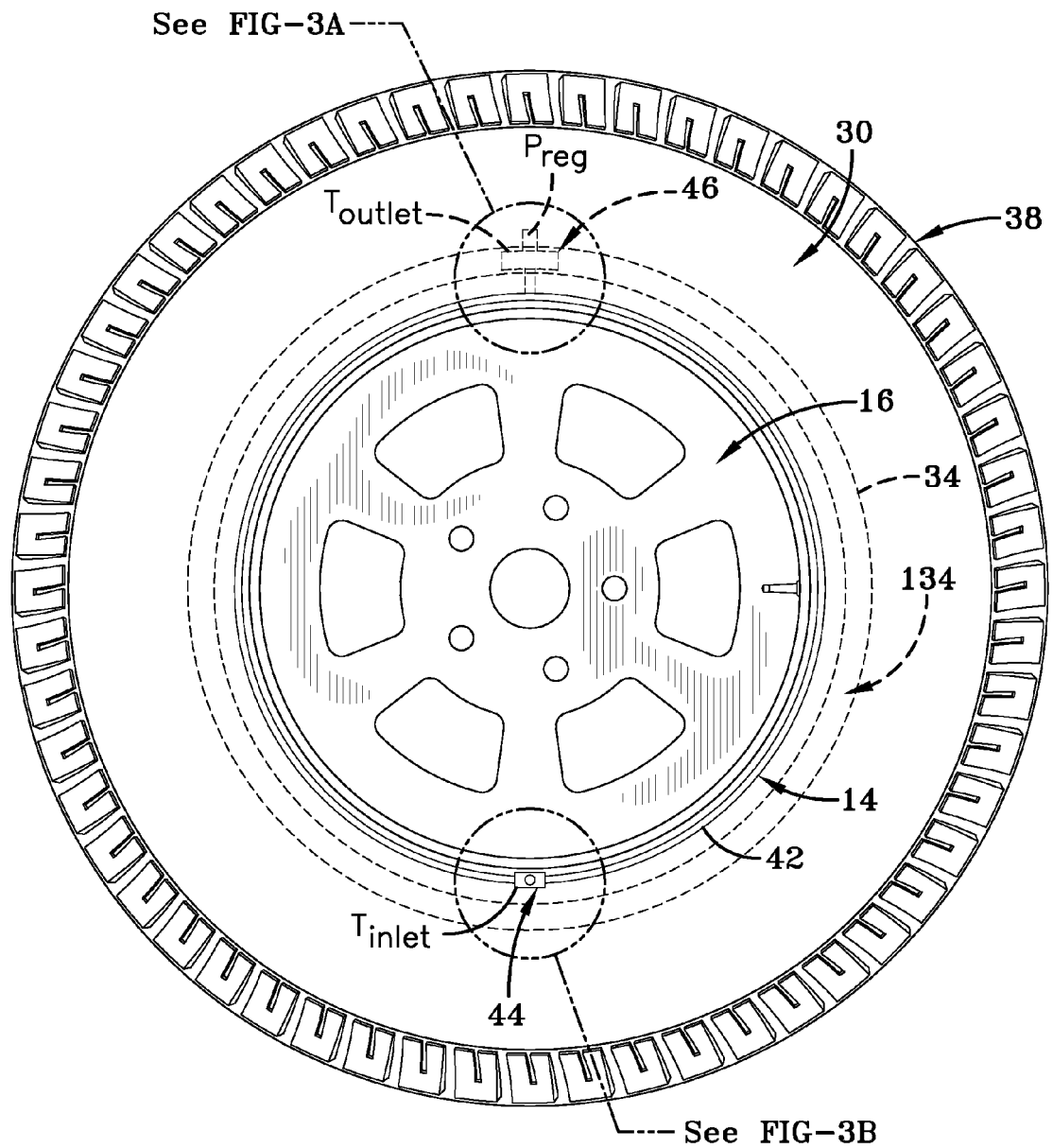
FIG. 2 is a side view of a tire with a sidewall mounted air pump assembly.

Referring to FIGS. 1, 1A, 2, and 6, a tire assembly 10 includes a tire 12, a pair of peristaltic pump assemblies 14, 15 and a tire rim 16. The tire mounts in conventional fashion to a pair of rim mounting surfaces 18, 20 adjacent outer rim flanges 22, 24. The rim flanges 22, 24, each have a radially outward facing surface 26. A rim body 28 supports the tire assembly as shown. The tire is of conventional construction, having a pair of sidewalls 30, 32 extending from opposite annular bead cores 34, 36 to a crown or tire tread region 38. The tire and rim enclose a tire cavity 40.

As seen from FIGS. 1, 1A, 2 and 3A, B, and C, each peristaltic pump assembly 14, includes an annular air tube 42 that encloses an annular passageway 43. While two pump assemblies 14, 15 are shown, one for each sidewall, it will be appreciated that a single pump assembly may be deployed without departing from the invention. For the simplicity of explanation, only the assembly 14 will be described in detail; it being understood that the operation and construction of assembly 15 to the opposite tire side would be a mirror image thereof. The tube 42 is formed of a resilient, flexible material such as plastic or rubber compounds that are capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described.

The peristaltic pump assembly 14 further includes an inlet device 44 and an outlet device 46 spaced apart approximately 180 degrees at respective locations within the air tube 42. The outlet device 46 has a cylindrical sleeve 48 positioned within the air tube passageway 43. The sleeve 48 has an outlet portal 50 formed therein and an axial passageway 49 in air flow communication with the portal 50 and the tube passageway 43. Spring loaded ball valves 52, 54 reside within valve seats 56, 58 located within the sleeve passageway 49 on opposite sides of the sleeve outlet portal 50. The outlet portal 50 of the sleeve 48 couples to a core bead conduit 60 having an axial passageway 62. Situated within the sleeve 48 within passageway 43, the ball valves 52, 54 selectively open and close subject to air pressure from air flow within the passageway 43. The ball valves 52, 54 are spring biased in a conventional configuration and are biased into a normally closed configuration closing off the outlet portal 50 until opened by air flow of passageway 43. The magnitude of bias desired for enabling air flow from passageway 43 through outlet 50 can be achieved through appropriate selection and setting of the valve springs.

Figure 3A:
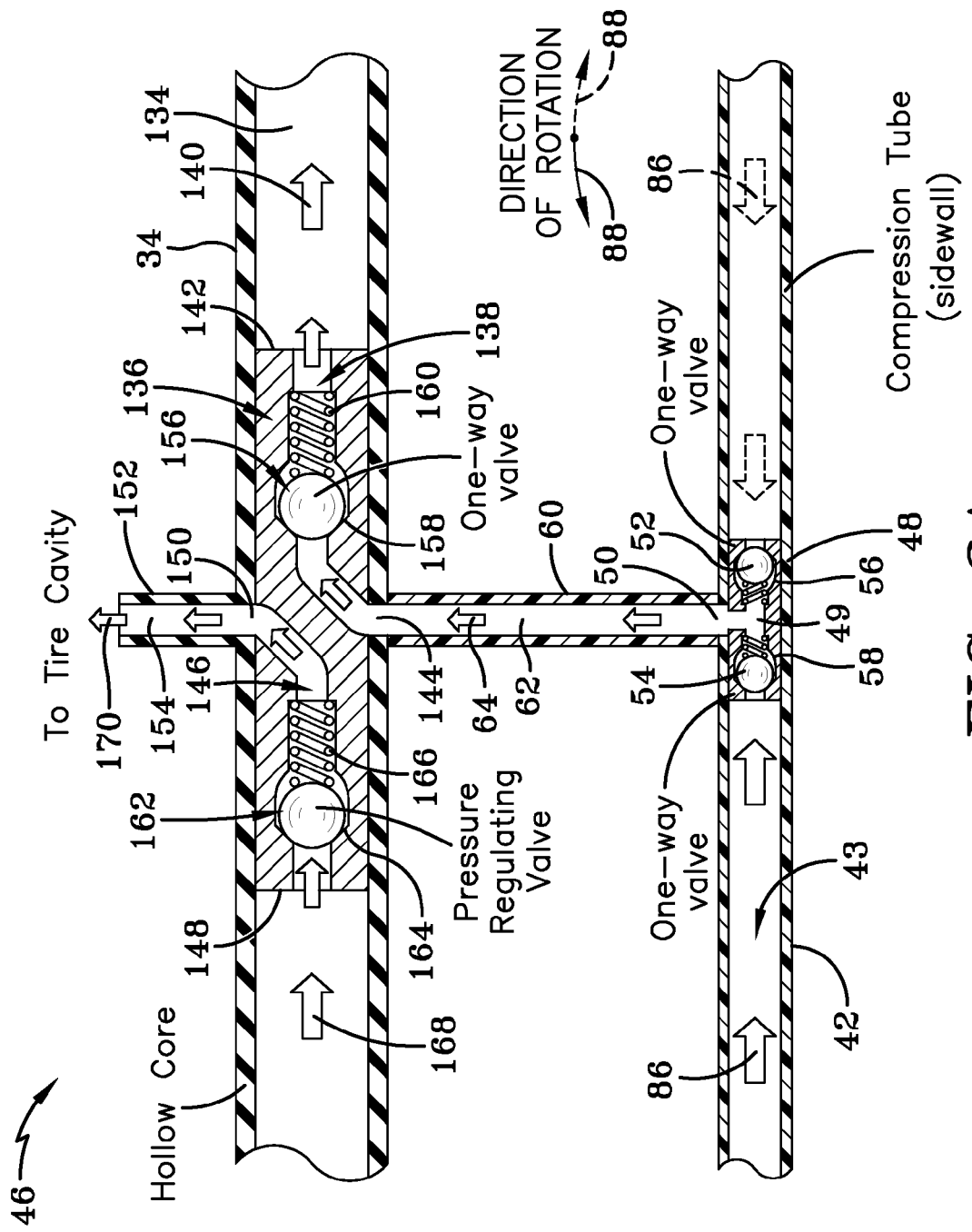
FIG. 3A is an enlarged schematic of the sidewall and bead core pump assembly located at the designated region identified in FIG. 2.
Figure 3B:
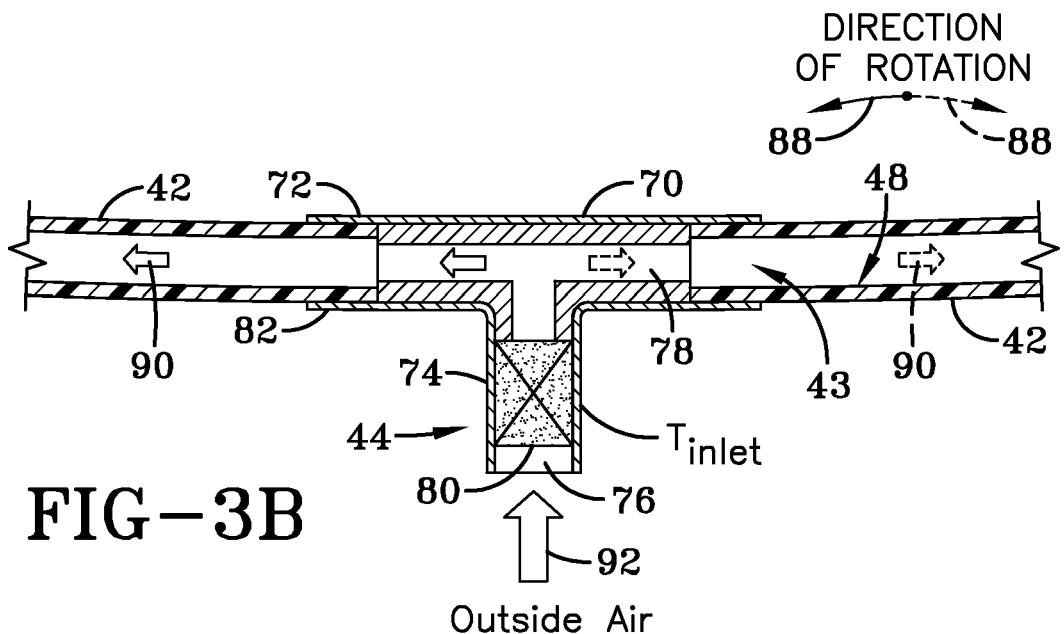
FIG. 3B is enlarged fragmentary view of the inlet and filter operation of the sidewall and bead core pump.
Figure 3C:
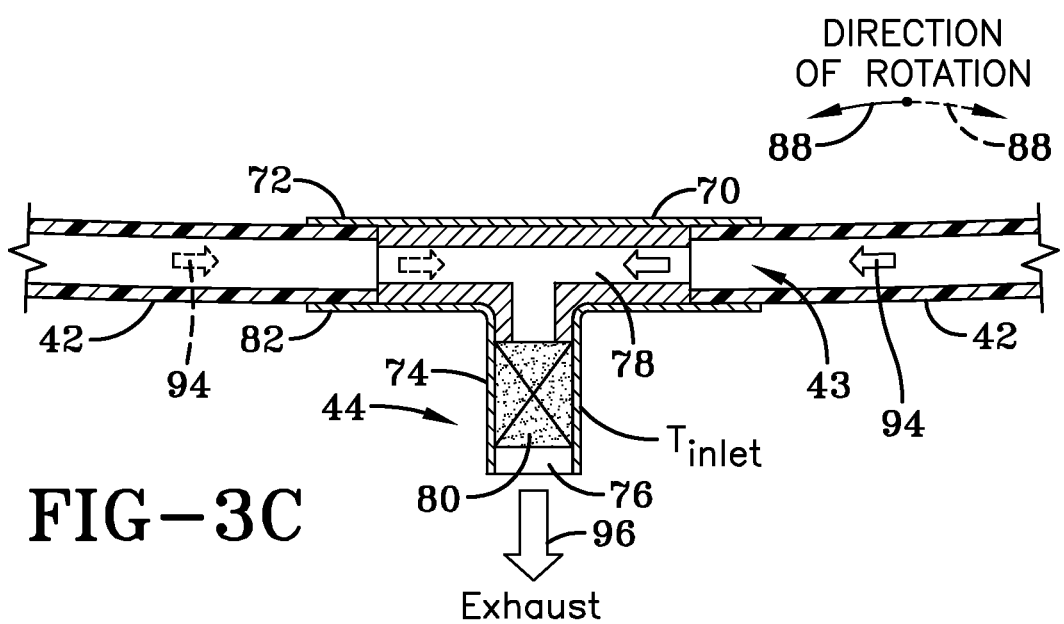
FIG. 3C is an enlarged fragmentary view of inlet and filter operation of the sidewall and bead core pump in the exhaust mode.

Referring to FIGS. 3B and 3C, the inlet device 44 within the passageway 43 of the air tube 42 is similarly of T-shaped configuration having a pair of co-axial inlet sleeves 70, 72 co-aligned with an inlet portal sleeve 74. An air passageway 76 extends through the inlet portal sleeve 74 and permits the flow of air into and out of the air passageway of the tube 42. A filter 80 may be positioned within the inlet portal sleeve 74. Filter 80 is composed of a porous filtering agent of a type conventionally available. So positioned within the sleeve 74, the filter 80 purifies air entering the tube passageway 43, identified in FIG. 3B as "outside air". A back flow of air out of passageway 43, through the filter 80 within sleeve 74, as shown in FIG. 3C, operates to self-clean the filter by forcing our particles trapped within the porous filtering medium. An insert T-body 82 resides within the inlet device 44 and serves to line the sleeves 70, 72.

As will be appreciated from FIGS. 3A-C and 4A, the inlet device 44 and the outlet device 46 are positioned within the circular air tube 42 generally 180 degrees apart. The tire rotates in a direction of rotation 88, causing a footprint 100 to be formed against the ground surface 98. A compressive force 104 is directed into the tire from the footprint 100 and acts to flatten a segment 110 of the air tube passageway 43 as shown at numeral 106. Flattening of the segment 110 of the passageway 43 forces air from the segment along tube passageway 43 in the direction shown by arrow 84, toward the outlet device 46.

As the tire continues to rotate in direction 88 along the ground surface 98, the tube 42 will be sequentially flattened or squeezed opposite the tire footprint segment by segment in a direction opposite to the direction of tire rotation 88. The sequential flattening of the tube passageway 43 segment by segment causes evacuated air from the flattened segments to be pumped in the direction 84 within tube passageway 43 to the outlet device 46. When the air flow is sufficient against ball valve 52, the valve will open and allow air to flow through the outlet device 46 into the passageway 62 of the core bead conduit 60. as shown by arrow 64. As referenced by arrow 86, air exiting the outlet device sleeve 52 is routed to the tire cavity 40 and serves to re-inflate the tire to a desired pressure level. The tire cavity pressure acts against the ball valves 60, 62 in combination with any ancillary biasing spring (not shown) which must be overcome by the air pressure within the tube passageway 43 in order for the ball valve to open.

Figure 4A:
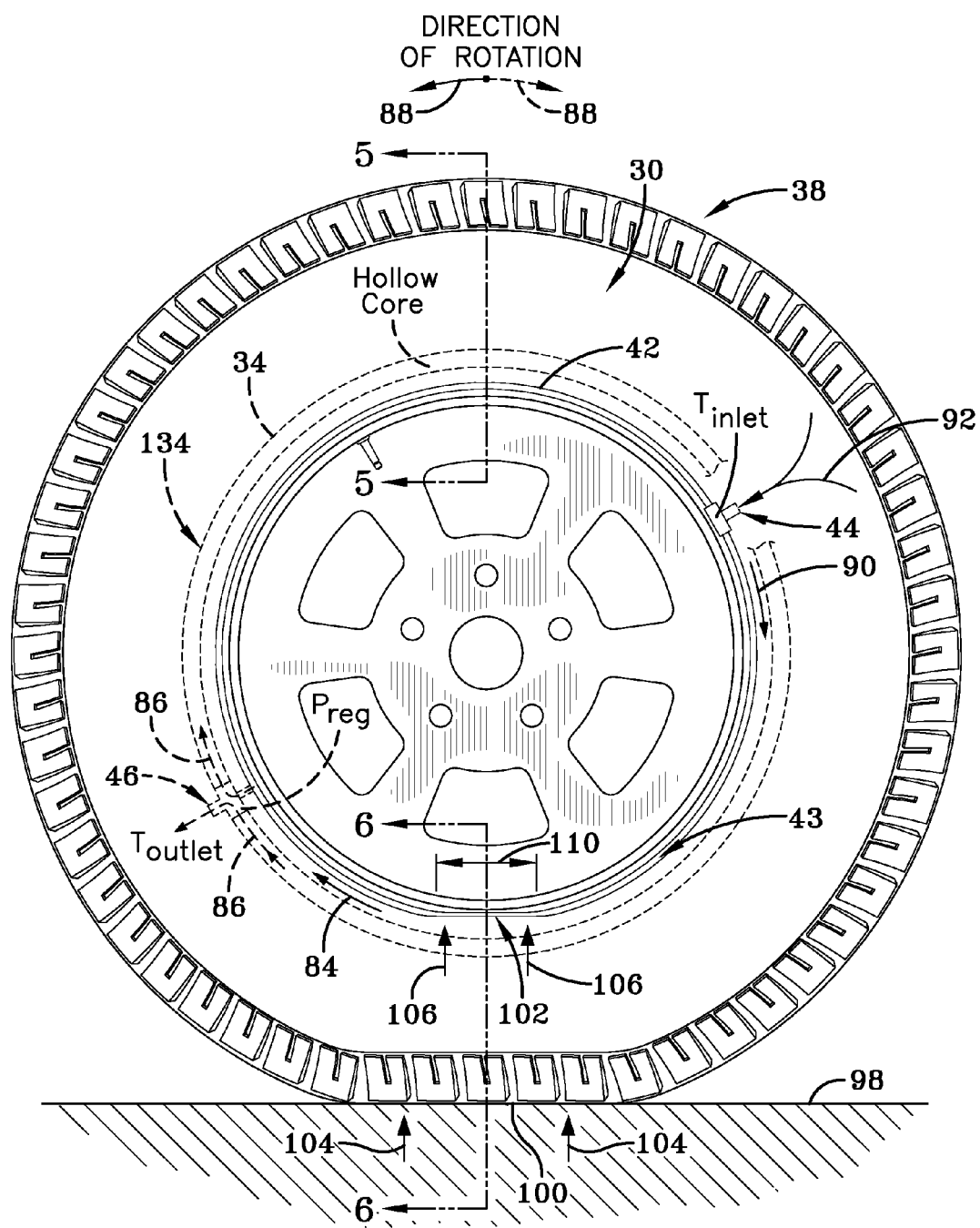
FIG. 4A is a side view of tire, rim, tubing, and valves showing operation of the sidewall and bead core pump assembly illustrating air flow when the tire rotates.
Figure 4B:
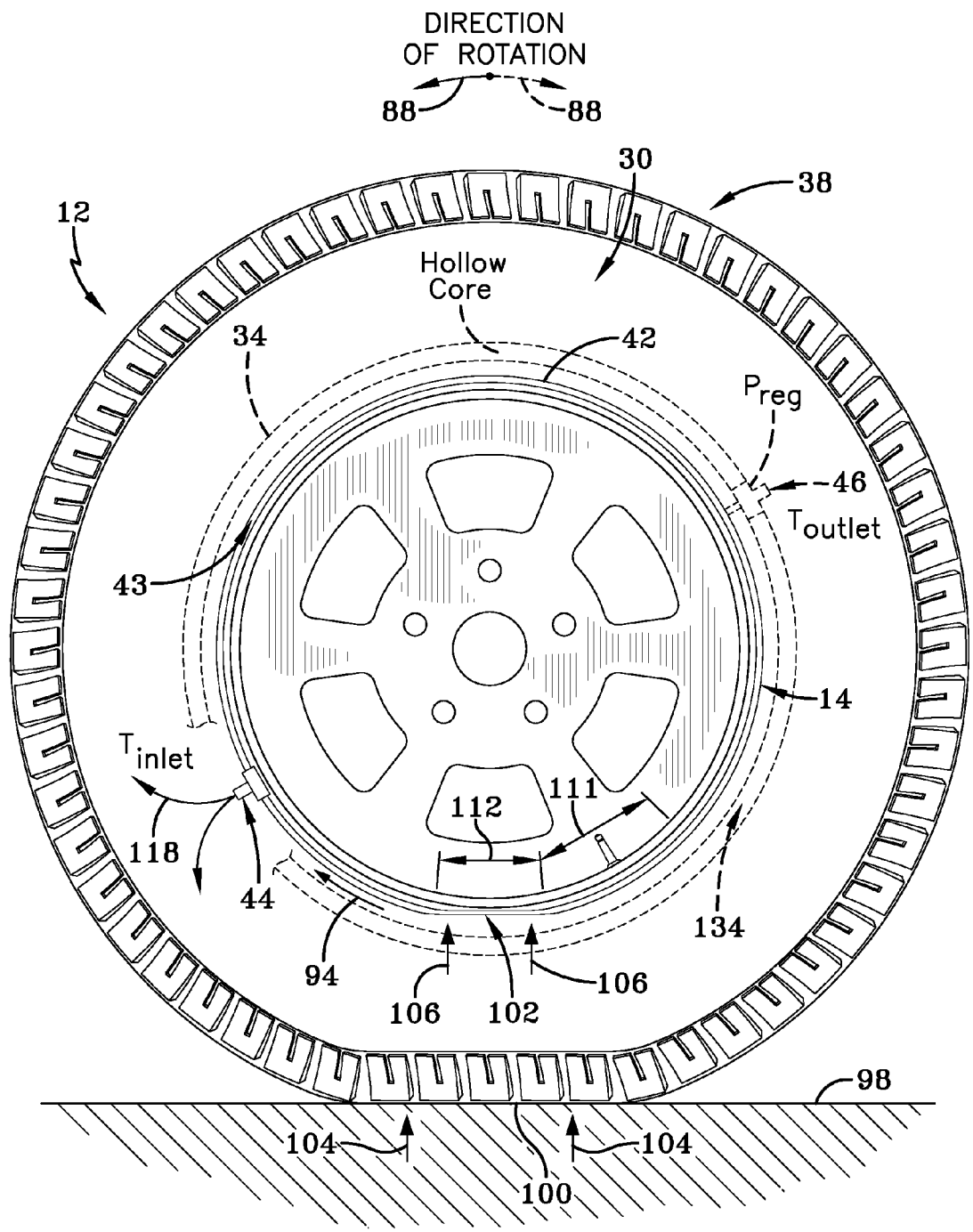
FIG. 4B is a side view of the tire, rim, tubing, and valves showing operation of flow back out of the filter (cleaning) when the tire rotates.

With the tire rotating in direction 88, flattened tube segments are sequentially refilled by air 92 flowing into the inlet device 44 along the passageway 43 in the direction 90 as shown by FIGS. 3B and 4A. The inflow of air from the inlet device 44 in direction 90 continues until the outlet device 46, rotating counterclockwise as shown with the tire rotation 88, passes the tire footprint, 100. FIG. 3C and FIG. 4B show the orientation of the peristaltic pump assembly 14 in such a position. In the position shown, the tube 42 continues to be sequentially flattened segment by segment adjacent the tire footprint by compressive force 104 as shown at numeral 106. Air is pumped in the clockwise direction 94 to the inlet device 44 where it is evacuated or exhausted from the passageway 43. Passage of exhaust air 96 from the inlet device 44 is through the filter 80 which acts to self-clean the filter of accumulated debris or particles within the porous medium. With the evacuation of pumped air out of the inlet device 44, the outlet device is in the closed position and air does not flow to the tire core bead as will be explained. When the tire rotates further in counterclockwise direction 88 until the inlet device 44 passes the tire footprint 100 (as shown in FIGS. 3A, 3B, and 4A), the airflow resumes to the outlet device 46, opening the ball valve within the outlet device 46, and causing the pumped air to flow out (86) into the passageway 62 of the core bead conduit 60.

FIG. 4B illustrates that the tube 42 is flattened at designated numeral 102 segment by segment as the tire rotates in direction 88. A flattened segment 111 moves counterclockwise in direction 88 with the tire as an adjacent segment 112 moves adjacent the tire footprint. Accordingly, the progression of squeezed or flattened tube segments can be seen to move in a clockwise direction, counter to the tire rotation in direction 88. As segment 111 moves away from the footprint 100, the compression forces within the tire from the footprint region are eliminated and the segment 111 is free to resiliently reconfigure into an unflattened state as segment 111 refills with air from passageway 43. In the original non-flattened configuration segments of the tube 42 are generally circular in section; however, other cross-sectional configurations such as elliptical may be employed if desired.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 88 of the tire 12 is shown in FIGS. 4A and 4B to be counterclockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Figure 5A:
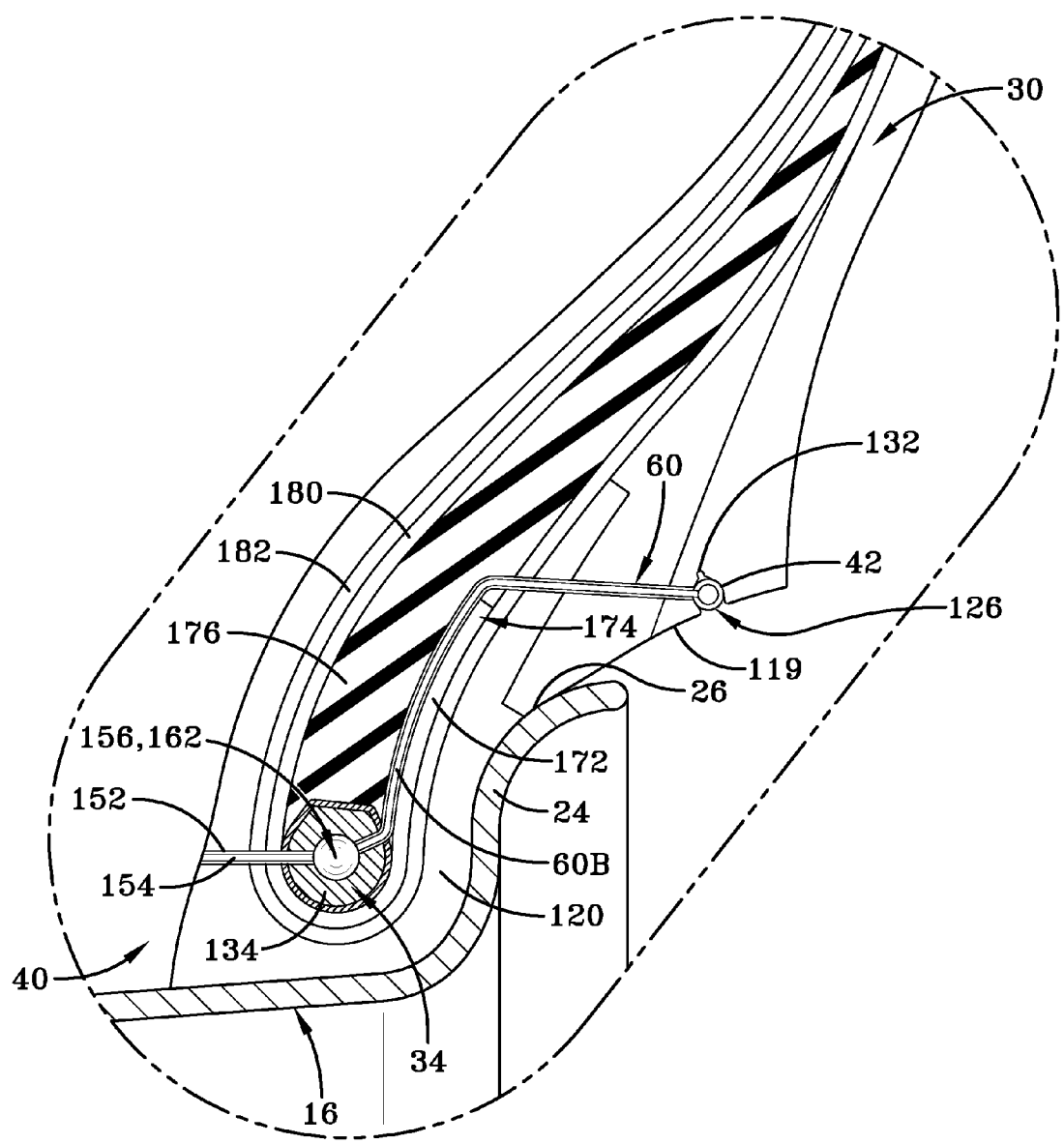
FIG. 5A is an enlarged section view of a first air tube and rim location.

One location of the peristaltic pump assembly within the tire assembly 10 will be understood from FIGS. 5 and 5A. As shown, the peristaltic pump assembly 14 is positioned within an underside 119 of the sidewall 30 of the tire at a location above the chafer 120 and the rim flange surface 26. So positioned, the air tube 42 is radially inward from the tire footprint 100 and is thus positioned to be flattened by forces directed from the tire footprint as described above. The segment or the tube 42 adjacent the footprint of a rolling tire will flatten from the compressive force directed from the footprint, whereby sidewall surfaces enclosing the tube 42 will constrict against and flatten the tube. The positioning of the tube 42 is specifically shown within the sidewall underside 119 of the tire above the rim surface 26. The diametric sizing of the peristaltic pump air tube 42 is selected to span the circumference of the tire sidewall surface 119.

The tube 42 is located within a groove 126 in the sidewall 30 of the tire 12. The tube 42 as will be explained is closed by compression strain bending the sidewall groove 126 within a rolling tire footprint. The location of the tube 42 in the sidewall 30 affords the user freedom of placement and avoids contact between the tube 42 and the rim 16. The higher placement of the tube 42 in the sidewall groove 126 uses the deformation of the sidewall as it passes through the tire footprint to close the tube and provide the pumping The configuration and operation of the groove 126 to flatten the tube 42 is shown in FIGS. 3C, 5B, 6 and 6A. The groove 126 is defined by parallel entryway sidewalls 128, 130 at a groove entryway opening having a nominal width sufficient to closely admit the tube 42 with interference but without constricting the air passageway 43 extending through the tube 42. The groove sidewalls 128, 130 merge into an interior bight region 132 and resiliently flex about region 132 subject to compression forces generated within the tire footprint. The segment of sidewalls 128, 130 within the tire footprint will flex and converge against the segment of tube 42 therein to collapse the tube into a flattened state as described previously. Alternative geometries and configurations for the groove 126 are disclosed in the specification in co-pending U.S. patent application Ser. No. 12/643,176, filed Dec. 21, 2009 incorporated herein by reference.

Referring to FIGS. 1, 1A, 3A, and 5A, the tube 42 is coupled through the core bead conduit 60 to the core bead 34 (the tube in the opposite sidewall being coupled to core bead 36). The conduit 60 is routed from the tube 42 within groove 126 of sidewall surface 119 in a radial direction over an end 174 of ply turnup 172, and axially along the tire apex 176 to the core bead 34 as best seen from FIG. 5A.

The core bead 34 is annularly configured having an axial annular air-storage passageway 134 therein. Situated within the core bead passageway 134 is a valve T-sleeve 136 having a first valve bore 138 extending from a downstream sleeve end 142 to an intake opening 144 that couples to the passageway 62 of the core bead conduit 60. Positioned within the first sleeve bore 138 is a first ball valve 156 captured within a valve seat 158. The first ball valve 156 is spring biased by a spring component 160 into a normally closed position closing off the first sleeve bore 138 until air pressure in the direction 64 pushes the ball valve 156 axially into an open position, whereby allowing air flow in direction 64 from the core bead conduit 60 into, through, and out of the first bore 138. Air passing through the first bore 138 is directed into the axial core bead passageway 134 in the direction indicated at 140 as shown in FIG. 3A.

Extending into an opposite end of the sleeve 136 is a second sleeve bore 136 that extends from an upstream end 148 of the sleeve to an outlet opening 150. The outlet opening 150 couples to an axial conduit passageway 154 of a tire cavity conduit 152 extending from the core bead 34 to the tire cavity 40. Positioned within the second sleeve bore 136 is a ball valve 162 within a valve seat 164. The ball valve 162 is spring biased by a spring component 166 into a normally closed position closing off the second sleeve bore until air pressure in the direction 168 pushes the ball valve 162 axially into an open position, whereby allowing air flow in direction 168 into, through, and out of the second bore 136 and into the axial conduit passageway 154 of the tire cavity conduit 152.

With reference to FIGS. 1, 1A, 4A, 4B, and 3A, the core beads 34, 36 are of conventional construction adapted to contain an axial passageway 134 in one or both core beads. The tube(s) 42 are of flexible construction of a material providing the requisite elasticity, such as plastic. As the tube 42 sequentially flattens segment by segment within the tire footprint of a moving vehicle, air is pumped along the air tube 42 through the one-way valves 52, 54 and out of the outlet portal 50 into the core bead conduit 60. The evacuated air from the tube 42 is conveyed by conduit 60 to the core bead 34, causing one-way ball valve 156 to open and the air to pass through the sleeve bore 138 into the core bead passageway 134 as shown by arrow 140. Should air pressure within the tire cavity 40 fall below a preset level and below the air pressure within the core bead conduit passageway 134, the pressure regulating valve 162 will open. Air flowing in direction of arrow 168 will pass through the bore 146 and valve 162 into the tire cavity conduit 152 for conveyance into the tire cavity 40.

FIG. 5A depicts an embodiment wherein the tire includes a ply 178 having a turn-up 172 extending around the core bead 34 to a turn-up end 174. The radial position of the air tube 42 within the surface 119 of sidewall 30 is generally opposite the turn-up end 174. A first segment 60A of the core bead conduit 60 extends axially from the air tube 42 through the tire sidewall and above the turn-up end 174, whereupon a second segment 60B of the core bead conduit 60 angles radially downward along a path between the tire apex 176 and the turn-up 172 to the core bead 34. Thus the flow path in the embodiment shown in FIG. 5A only passes through the ply 178 once, making the flow path more robust. Positioning the valving 156, 162 within the hollow core bead 34 protects the valves during operation and simplifies manufacturing. In addition, the hollow bead 34 serves as an air reservoir for collecting and storing air evacuated from the air tube 42 until such time as required to re-inflate the tire cavity 40. Further, the flow path of air through the conduit 60 is robust and passes only once through the tire ply.

Figure 5B:
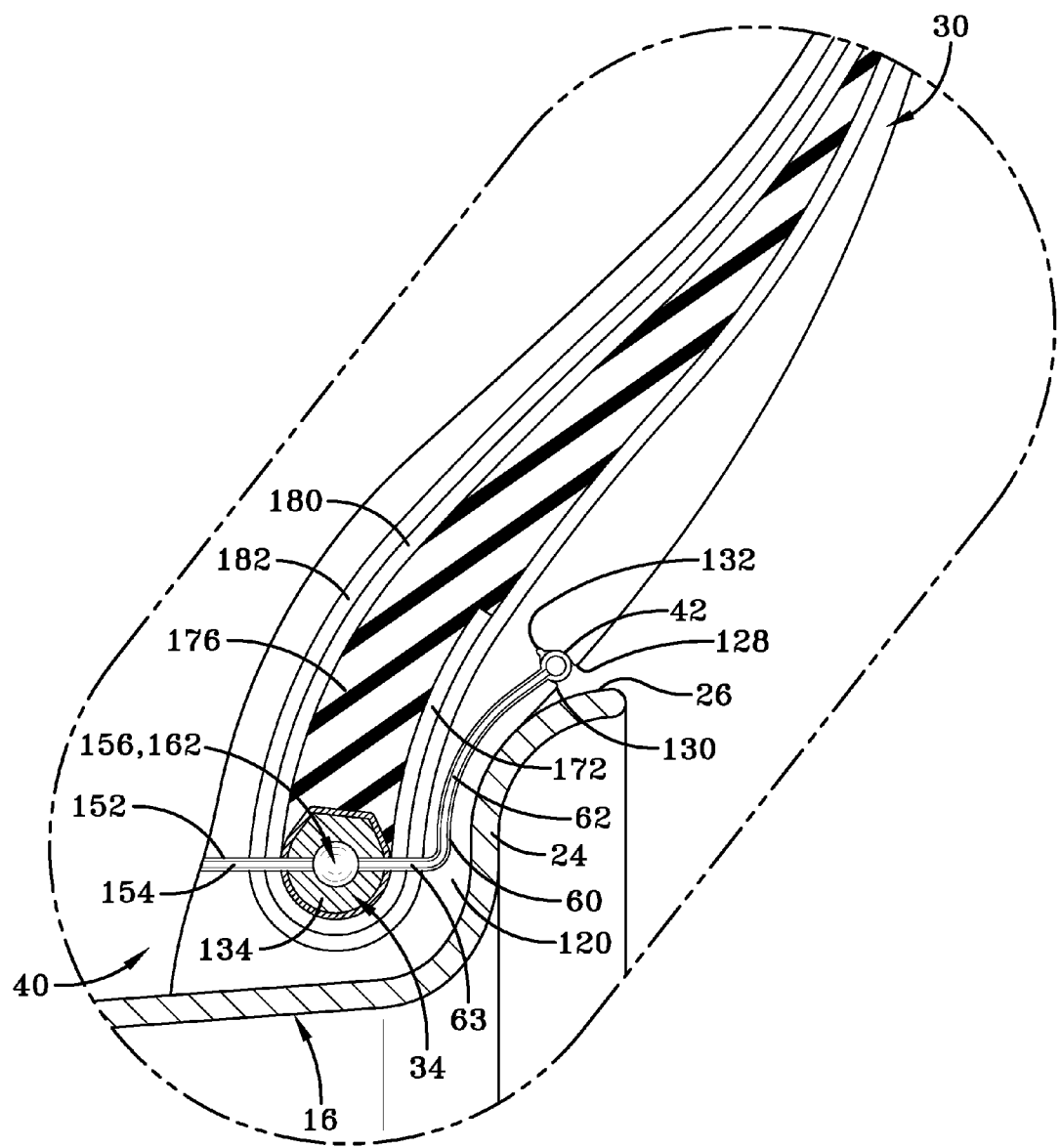
FIG. 5B is an enlarged section view of an alternative air tube and rim location.
Figure 6A:
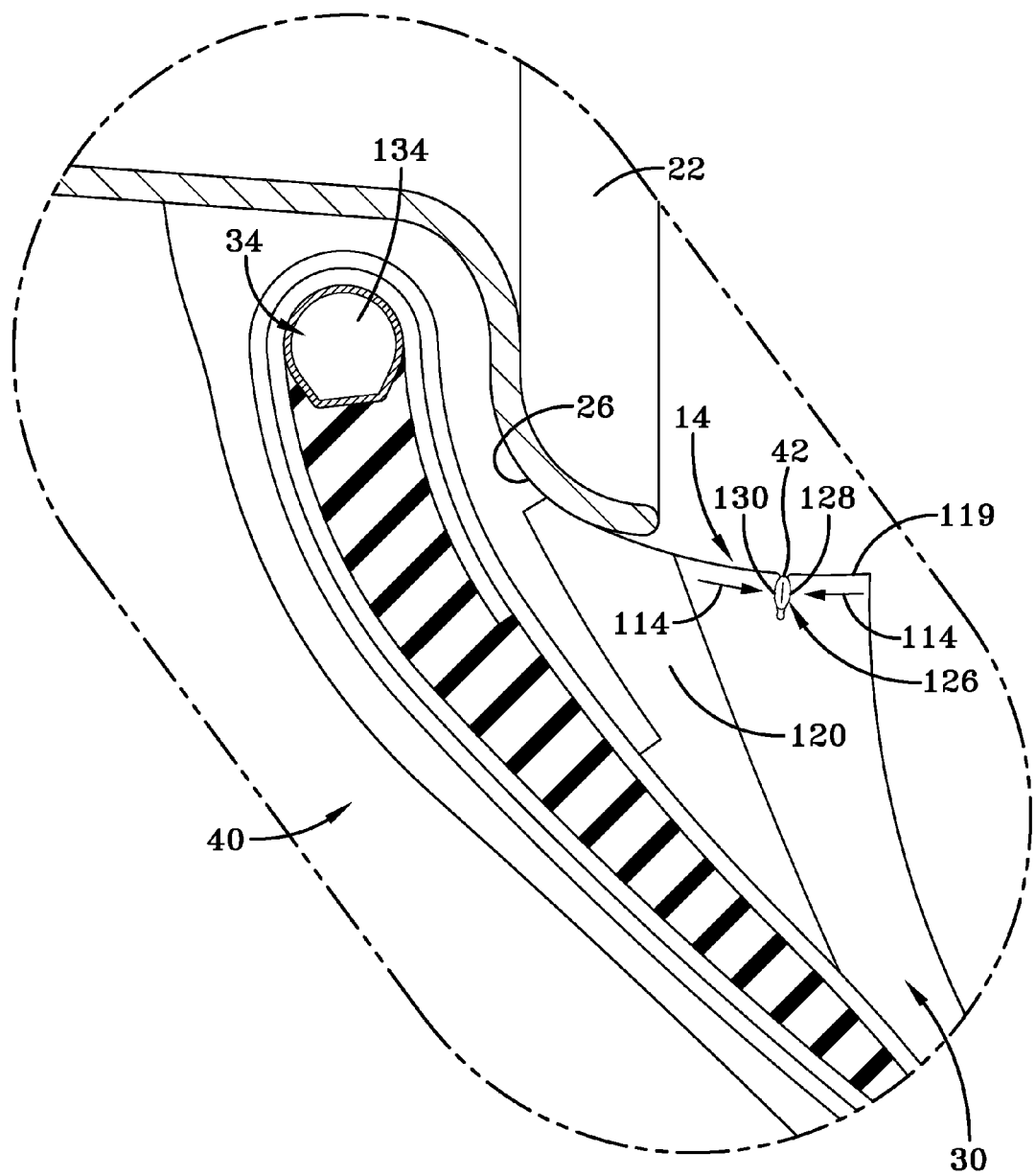
FIG. 6A is an enlarged section view of the air tube within the configured groove of FIG. 6 with the tube in a flatted condition.

FIG. 5B shows an alternative schematic wherein a first segment 60A of the core bead conduit 60 is routed from the air tube 42 radially downward within the sidewall 30 until axially opposite the core bead 34. A second conduit segment 60B of the conduit 60 thereupon angles into an axial orientation and progresses along an axial path through the ply turnup 172 to the core bead 34. In both configurations shown by FIGS. 5A and 54, the air tube 42 and sidewall groove 130 are generally radially above the core bead 34 and above the rim flange outer surface 26. The air tube 42 and the core bead passageway 134 are preferably, but not necessarily, annular and extend the circumference of the sidewall 30 and core bead 34, respectively.

From the forgoing, it will be appreciated that the subject invention provides a bi-directionally peristaltic pump for a self-inflating tire in which a circular air tube 42 flattens segment by segment and closes in the tire footprint 100. The air inlet T-device 44 may include a filter 80 and be self-cleaning. The outlet T-device 46 employs a valve unit that may be configured as two one-way valves such as, but not limited to, the ball valves 60, 62. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

From the foregoing, it will be appreciated that the subject invention achieves a self-inflating tire assembly 10 including the rim 16, tire 12; and one or two air tube assemblies 14 located within a respective tire sidewall groove 126. Each air tube 42 is in contacting engagement with opposite angled groove surfaces (128/136 and 130/138) surrounding the air tube 42. The air passageway 43 of a footprint segment of the air tube 43 is flattened from an expanded diameter to a flat diameter by compression of the groove in a rolling tire footprint to force air evacuated from the flattened segment along the air passageway 43. Air pumped along each air tube 42 is directed through a respective tire side to a respective core bead 34,36. Situated in the core beads 34, 36 is an axial passageway 134 that stores evacuated air until needed to re-inflate the tire cavity 40. Valving located within the axial passageway 134 opens to initiate the flow of stored air along a tire cavity conduit 152 into the tire cavity 40 whenever the air pressure within the tire cavity 40 falls below a preset valving pressure threshold. The tire is thus self-inflating, relying upon air pumped along the tube 42 into the core bead passageway and from the passageway into the cavity 40 as the vehicle is operated.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a tire having a tire cavity between first and second sidewalls that extend respectively from first and second tire core beads to a tire tread region;
   at least a first sidewall having at least one bending region operatively bending within a rolling tire footprint responsive to a bending strain;
   a sidewall groove positioned within the bending region of the tire first sidewall;
   an air tube having an internal tube air passageway, the air tube positioned within the sidewall groove in contacting engagement with opposite groove surfaces at least partially surrounding the air tube, the sidewall groove operatively bending within the bend region within a rolling tire footprint to compress the air tube from an expanded diameter to a flat diameter adjacent the rolling tire footprint, whereby operatively forcing air from a flattened air tube segment along the tube air passageway;
   a core bead passageway extending within at least a first core bead for operatively storing air evacuated from the air tube passageway;
   a core bead conduit extending from the air tube to the core bead passageway for operatively conveying air from the air tube passageway into the core bead passageway; and
   a tire cavity conduit extending from the core bead passageway to the tire cavity for operatively conveying air from the core bead passageway to the tire cavity.

2. The tire assembly of claim 1, wherein the air tube and the sidewall groove are located within a sidewall region of the first tire sidewall above an upper boundary of the first core bead.

3. The tire assembly of claim 2, wherein the groove surfaces contact the air tube and bend within a footprint of a rotating tire to operatively close an air tube segment within the tire footprint.

4. The tire assembly of claim 3, wherein the air tube comprises an annular body extending substantially a circumference of the tire first sidewall.

5. The tire assembly of claim 4, wherein the sidewall groove is annular and located proximally above the tire first core bead.

6. The tire assembly of claim 1, wherein the groove extends into an annular, substantially radial region of the tire first sidewall.

7. The tire assembly of claim 1, wherein the core bead passageway is substantially annular and extends substantially a circumference of the tire first sidewall within the first tire core bead.

8. The tire assembly of claim 1, wherein further comprising a one-way valve within the core bead passageway in air flow communication with the core bead conduit, the one-way valve operatively opening to admit air flow into core bead passageway from the core bead conduit.

9. The tire assembly of claim 8, wherein further comprising a pressure regulating valve within the core bead passageway in air flow communication with the tire cavity conduit, the pressure regulating valve operatively opening responsive to a preset tire cavity air pressure level to admit air flow into the tire cavity conduit from the core bead conduit.

10. The tire assembly of claim 9, wherein the tire further comprises a tire apex component adjacent the first tire bead core region and a tire inner ply turnup portion extending around the first tire bead core and extending radially along the tire apex component to an inner ply turnup end, the core bead conduit extending from the air tube along a path situated between the inner ply turnup and the tire apex component to the first tire core bead passageway.

11. The tire assembly of claim 10, wherein the core bead conduit comprises at least a first core bead conduit segment extending substantially axially inward from the air tube through a tire sidewall, and at least a second core bead conduit segment extending substantially radially from the first core bead conduit segment along the path situated between the inner ply turnup and the tire apex component to the first tire core bead.

12. The tire assembly of claim 11, wherein the air tube and the sidewall groove are located within the tire sidewall substantially opposite the inner ply turnup end.

13. The tire assembly of claim 1, wherein the tire further comprises a tire apex component adjacent the first tire core bead and a tire inner ply turnup portion extending about the first tire core bead and extending radially along the tire apex component to an inner ply turnup end, and the core bead conduit extending from the air tube along a path situated between the inner ply turnup and the tire apex component to the first tire core bead.

14. The tire assembly of claim 13, wherein the core bead conduit comprises at least a first core bead conduit segment extending substantially axially inward from the air tube through a tire sidewall, and at least a second core bead conduit segment extending substantially radially from the first core bead conduit segment along the path between the inner ply turnup and the tire apex component to the first tire cord bead.

15. The tire assembly of claim 14, wherein the air tube and the sidewall groove are located within an underside surface of a tire sidewall at a radial position substantially opposite the inner ply turnup end.

\* \* \* \* \*